(12) United States Patent
Garaga et al.

(10) Patent No.: US 11,734,081 B2
(45) Date of Patent: *Aug. 22, 2023

(54) SYSTEM AND METHOD FOR AN EFFICIENT AND SCALABLE MULTITENANT IMPLEMENTATION FOR CONTENT MANAGEMENT SERVICES PLATFORMS, INCLUDING CLOUD DEPLOYED CONTENT MANAGEMENT SERVICES PLATFORMS

(71) Applicant: Open Text Holdings, Inc., San Mateo, CA (US)

(72) Inventors: Pulla Rayudu Garaga, Bangalore (IN); Sekhar Venkatesan, Bangalore (IN)

(73) Assignee: OPEN TEXT HOLDINGS, INC., Menlo Park, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/499,706

(22) Filed: Oct. 12, 2021

(65) Prior Publication Data

US 2022/0066837 A1 Mar. 3, 2022

Related U.S. Application Data

(63) Continuation of application No. 16/579,357, filed on Sep. 23, 2019, now Pat. No. 11,200,095.

(51) Int. Cl.
| | | |
|---|---|---|
| *G06F 16/00* | (2019.01) | |
| *G06F 9/50* | (2006.01) | |
| *G06F 12/0846* | (2016.01) | |
| *G06F 16/23* | (2019.01) | |
| *G06F 16/182* | (2019.01) | |
| *G06F 16/28* | (2019.01) | |
| *G06F 21/31* | (2013.01) | |

(52) U.S. Cl.
CPC .......... *G06F 9/5061* (2013.01); *G06F 9/5016* (2013.01); *G06F 12/0848* (2013.01); *G06F 16/182* (2019.01); *G06F 16/23* (2019.01); *G06F 16/289* (2019.01); *G06F 21/31* (2013.01)

(58) Field of Classification Search
None
See application file for complete search history.

(56) References Cited

U.S. PATENT DOCUMENTS

| | | | | |
|---|---|---|---|---|
| 10,084,723 | B2* | 9/2018 | Mordani | G06F 8/656 |
| 10,169,090 | B2* | 1/2019 | Wang | H04L 45/021 |
| 11,200,095 | B2 | 12/2021 | Garaga et al. | |
| 2008/0086482 | A1* | 4/2008 | Weissman | G06F 16/2365 |
| 2013/0298183 | A1* | 11/2013 | McGrath | G06F 16/13 718/1 |
| 2014/0289391 | A1* | 9/2014 | Balaji | H04L 67/306 709/224 |
| 2015/0178135 | A1* | 6/2015 | Wang | H04L 45/742 718/104 |
| 2015/0373098 | A1* | 12/2015 | Mordani | G06F 9/5077 709/203 |

(Continued)

*Primary Examiner* — Jean M Corrielus
(74) *Attorney, Agent, or Firm* — Sprinkle IP Law Group

(57) ABSTRACT

Embodiments of a multitenant content server that employs embodiments of a database architecture for use in multitenant environments that includes a global partition and a tenant partition for each tenant. These partitions can be accessed using sessions corresponding to the partitions and interfaces associated with the tenants.

21 Claims, 4 Drawing Sheets

(56) References Cited

U.S. PATENT DOCUMENTS

2016/0094484 A1* 3/2016 Mordani ................. G06F 8/656
709/226
2017/0116125 A1* 4/2017 Sundaravaradan ..........................
G06F 16/24552
2017/0116130 A1* 4/2017 Sundaravaradan ..........................
G06F 16/2453
2017/0116135 A1* 4/2017 Sundaravaradan ..........................
G06F 16/9574

* cited by examiner

SYSTEM AND METHOD FOR AN EFFICIENT AND SCALABLE MULTITENANT IMPLEMENTATION FOR CONTENT MANAGEMENT SERVICES PLATFORMS, INCLUDING CLOUD DEPLOYED CONTENT MANAGEMENT SERVICES PLATFORMS

CROSS-REFERENCE TO RELATED APPLICATIONS

This application is a continuation of, and claims a benefit of priority under 35 U.S.C. 120 of the filing date of U.S. patent application Ser. No. 16/579,357, filed Sep. 23, 2019, issued as U.S. Pat. No. 11,200,095, entitled "SYSTEM AND METHOD FOR AN EFFICIENT AND SCALABLE MULTITENANT IMPLEMENTATION FOR CONTENT MANAGEMENT SERVICES PLATFORMS, INCLUDING CLOUD DEPLOYED CONTENT MANAGEMENT SERVICES PLATFORMS," the entire contents of which are hereby expressly incorporated by reference for all purposes.

TECHNICAL FIELD

This disclosure relates generally to content management platforms. Even more specifically, this disclosure relates to content management systems deployed on services platforms that may serve multiple tenants. Even more specifically, this disclosure relates to efficient and scalable multi-tenant content management systems deployed as cloud based services.

BACKGROUND

An emerging information technology (IT) delivery model is web services model, by which shared resources, software or information are provided over a network such as the Internet to computers and other devices on-demand. Many times such web services are provided in the context of cloud computing. A cloud computing service generally refers to a service that allows end recipient computer systems (thin clients, portable computers, smartphones, desktop computers and so forth) to access a pool of hosted computing or storage resources (i.e., the cloud resources) over a network (the Internet, for example). In this manner, the host, a cloud service, may, as examples, provide Software as a Service (SaaS) by hosting applications; Infrastructure as a Service (IaaS) by hosting equipment (servers, storage components, network components, etc.); or a Platform as a Service (PaaS) by hosting a computing platform (operating system, hardware, storage, etc.).

Cloud computing resources are typically housed in large server farms that run networked applications, typically using a virtualized architecture wherein applications run inside virtual servers, or so-called "virtual machines" (VMs), that are mapped onto physical servers in a data center facility.

One key characteristic of web services and cloud computing that is different from existing environments is the desire for so-called "multitenant" support, sometimes referred to as multitenant single deployment. To satisfy this requirement, service providers have to be able to isolate different usage of the services. Indeed, typically one of the most significant barriers keeping enterprises or organizations from utilizing such services resources are security related. In particular, shared environments have the potential to expose unprotected data to malicious attacks, hacking, and introspection by third parties, both intentional and otherwise. The service provider thus needs to maintain isolation between and among their specific users that are sharing resources.

This has proved problematic as many of the existing pieces of infrastructure used to create these web services and cloud computing platforms were not designed to work with or accommodate the demands of such multitenant support.

This situation is exacerbated in the context of content management systems deployed on a services platform. Often times large enterprises or other entities employ these content management systems (CMS) to manage their content. Content management system do just that, allowing for the management of such content by controlling the access, editing, updating, versioning, etc. of content. This type of content management is in no way trivial. In certain contexts, such as in an enterprise setting, there may be millions or even billions documents that need to be managed, and users may desire to have access to these documents from a variety of distributed access points. Moreover, each tenant usually desires that the management content be highly secure.

To facilitate content management in conjunction with such distributed access, content management systems may be organized around one or more content management servers that provide services associated with the management of such content. Content management servers like these may be deployed in the cloud or otherwise distributed. To support multitenancy then, and to ensure security of each tenant's data, in many cases there must be a complete deployment of the content management server for each tenant, associated repositories or cache, system jobs, licenses, or other physical hardware or software required to support such a separate deployment. These independent tenant deployments leads to high cost, slow deployment times for each tenant, and high administrative overhead, among other problems What is needed therefore are implementations of multi-tenant content management systems that simplify the addition of tenants and that remain efficient, powerful, and scalable while preserving isolation of data between tenants.

SUMMARY

To those ends, among others, embodiments as disclosed herein may provide multitenant content management server deployed on a services platform that utilizes a partitioned database. The partitioned database includes a global partition and a tenant partition for each of the tenants. The global partition includes metadata or other data that may be used by the content management server, including common data that may be shared across all tenants or utilized in the provisioning of content management for all tenants. This common data may include, for example, system objects, job objects, method objects, workflow object or data dictionary objects.

In particular, according to certain embodiments, the common data may include an object table that represent object types, objects, a mapping between object types and tenants, a mapping between objects and the associated tenant and a mapping between the object and the location of the content represented by that object. Each tenant partition may be used to store data specific to that particular tenant, including the content associated with that tenant and stored or accessed by that tenant's users.

Accordingly, the tenant specific data is isolated into individual database partitions (e.g., which may be created and managed dynamically within the content management server). The common data that can be shared across tenants is segregated into the global database partition. Thus embodiments provide scalability, more optimal memory utilization, and performance for content management servers since a single instance of the content management server serves multiple tenants (e.g., entities or sub-entities within an entity). The separation of tenant specific data and common data shared across multiple tenants can be effectively leveraged for almost any content management solutions deployed on a services platform, including those deployed in a cloud computing environment.

Embodiments may provide a global interface for the provisioning of a new tenant that may be accessed by an administrator associated with an entity or sub-entity (e.g., an existing tenant) during operation of the content management server. When an administrative user desires the provisioning of another tenant, the content management server can create a new partition in the database and update the global tables in the global partition to indicate the identifier for the partition.

When users access the content management server they are identified with a particular tenant. A session object for that user's session with the content management server is thus associated with the partition identifier for the particular session, such that the session (and thus the user) can only access partition data specific to that tenant. In this manner, the user's access to data from the partitions of other tenants is governed. Moreover, any content that the user adds (e.g., or alters) during the session with the content management server will also be assigned and stored in the partition associated with the tenant.

Accordingly, embodiments as disclosed herein may provide a number of advantages. For example, embodiments may allow the same database and instance of a content server to be utilized for a multitenant environment without substantial modifications to the content server platform, including the schema utilized by such a content server platform, while still ensuring the security of the data of each tenant. Thus, embodiments may provide data isolation and security for each tenant even within the context of multiple tenancy on a single instance of a content server as user specific data for each tenant is segregated and isolated to one database partition. Such capabilities may allow content management servers to be implemented in a more efficient manner that may consume fewer computing resources, including processor cycles, memory or other storage resources (e.g., database resources).

More specifically, embodiments may improve the ease of deployment of new tenants within a highly scalable content management environment by providing a single point of interaction for new tenant provisioning. Thus, the provisioning of new tenants on a content management platform may take on the order of minutes as opposed to hours or days.

As another advantage, a single instance of a content sever can simultaneously handle requests from different client applications associated with different tenants.

This ability optimizes the use of memory (e.g., RAM) being used for handling multiple tenants. Moreover, common data such as object type caches may be maintained in a global session that can be utilized or accessed in the servicing of requests for all tenants. In this manner, the memory footprint of the content server may be further reduced.

These, and other, aspects of the invention will be better appreciated and understood when considered in conjunction with the following description and the accompanying drawings. The following description, while indicating various embodiments of the invention and numerous specific details thereof, is given by way of illustration and not of limitation. Many substitutions, modifications, additions or rearrangements may be made within the scope of the invention, and the invention includes all such substitutions, modifications, additions or rearrangements.

BRIEF DESCRIPTION OF THE DRAWINGS

The drawings accompanying and forming part of this specification are included to depict certain aspects of the invention. A clearer impression of the invention, and of the components and operation of systems provided with the invention, will become more readily apparent by referring to the exemplary, and therefore non-limiting, embodiments illustrated in the drawings, wherein identical reference numerals designate the same components. Note that the features illustrated in the drawings are not necessarily drawn to scale.

DETAILED DESCRIPTION

Figure 1:
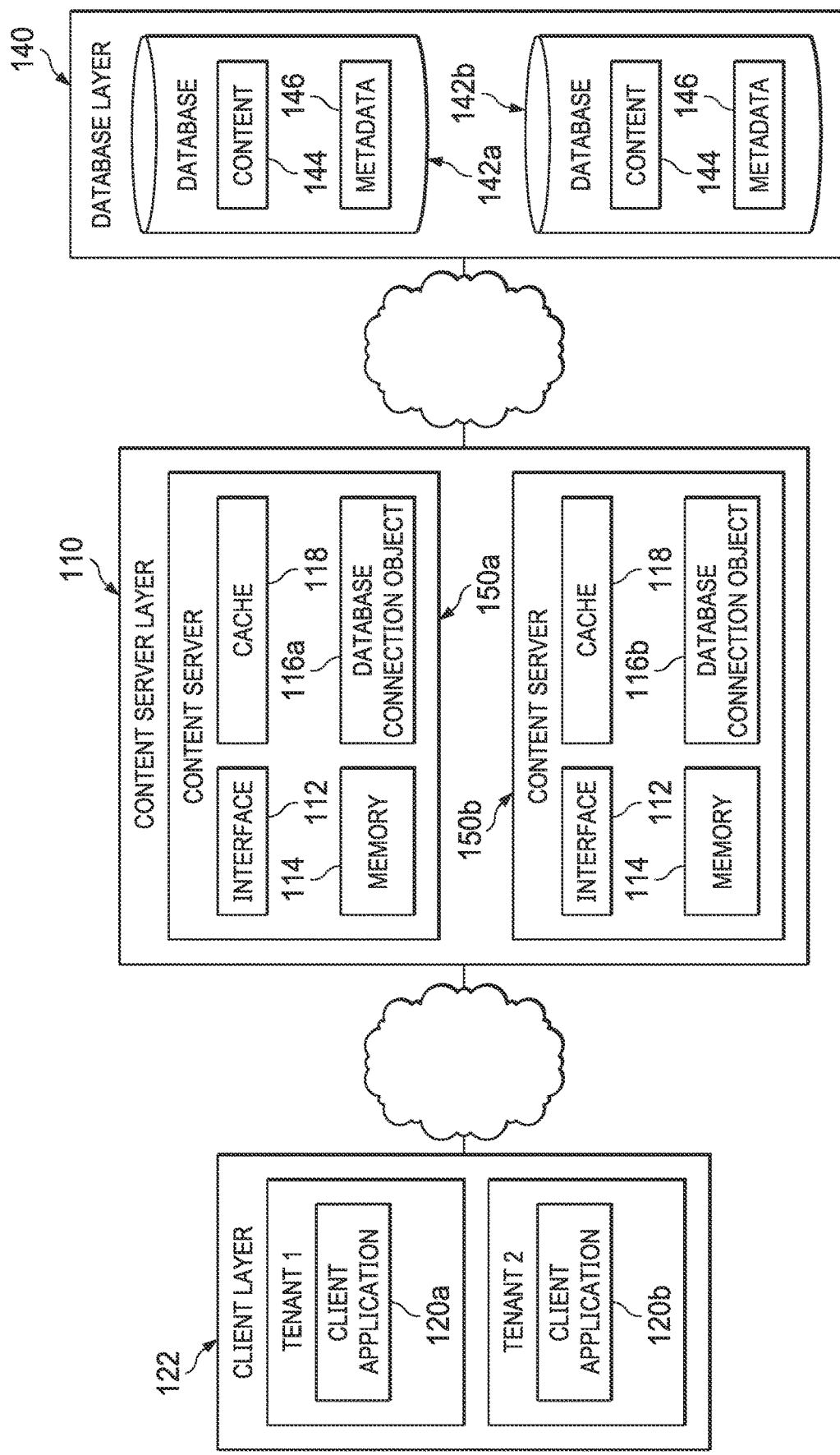
FIG. 1 is a diagrammatic representation of a computing architecture including a content server.

The disclosure and various features and advantageous details thereof are explained more fully with reference to the exemplary, and therefore non-limiting, embodiments illustrated in the accompanying drawings and detailed in the following description. It should be understood, however, that the detailed description and the specific examples, while indicating the preferred embodiments, are given by way of illustration only and not by way of limitation. Descriptions of known programming techniques, computer software, hardware, operating platforms and protocols may be omitted so as not to unnecessarily obscure the disclosure in detail. Various substitutions, modifications, additions and/or rearrangements within the spirit and/or scope of the underlying inventive concept will become apparent to those skilled in the art from this disclosure.

Before delving into embodiments in more detail, some brief context may be useful. An emerging information technology (IT) delivery model is cloud computing, by which shared resources, software or information are provided over a network such as the Internet to computers and other devices on-demand. When multiple parties share resources within a cloud computing and other such shared deployment model, a compelling transformation and reduction in their IT costs (from fixed to variable) can be achieved. Using this approach, entities can extend computing and storage capacity elastically to match demand, shift operational and capital costs to an external data center, free IT staff to focus on new projects, and more.

Cloud compute resources are typically housed in large server farms that run networked applications, typically using a virtualized architecture wherein applications run inside virtual servers, or so-called "virtual machines" (VMs), that are mapped onto physical servers in a data center facility.

One key characteristic of cloud computing that is different from existing environments is the desire for so-called "multitenant" support, sometimes referred to as multi-customer single deployment. To satisfy this requirement, service providers have to be able to isolate different usages of the cloud services. Indeed, typically one of the most significant barriers keeping an enterprise customer from utilizing such resources is the ability to gauge a provider's security posture in relation to its own security compliance requirements. In particular, shared environments have the potential to expose unprotected data to malicious attacks, hacking, and introspection by third parties, both intentional and otherwise.

The providers of these cloud services thus need to maintain isolation between and among their specific customers that are sharing cloud resources. Accordingly, such systems need to ensure end-to-end trust and security of customer data regardless of their underlying networks, platforms, virtualization mechanism or middleware. These security concerns are particularly germane in a content management environment where the entirety (or a great majority) of an enterprises content may be stored within such content management systems. This type of security has, however, proved problematic as many of the existing pieces of infrastructure used to create these cloud services platforms were not designed to work with or accommodate the demands of such multitenant support.

Accordingly, in a content management environment, to provide multitenant support a separate instance of a content server can be provided for each tenant. It will prove useful here to discuss implementation of a typical multitenant content management deployment utilizing separate content management servers, as implemented in standalone physical servers or in the context of a services platform. While descriptions here, and throughout, may be described using services platforms that are deployed in the cloud (e.g., cloud services or cloud services platforms) and databases, it should be noted here that in the context of descriptions of embodiments as presented herein, the term database will be used to apply generally to data storage systems or clusters, and the terms cloud platform or cloud services platform will be used to apply generally to any service platform though which software or functionality is offered through an interface, regardless of whether such software or functionality is deployed in a cloud computing environment or otherwise.

Turning first to FIG. 1 then, an architecture for multitenant support in a content management services environment is depicted. Here, content server layer 110 may provide content management for content associated with a set of tenants. This content server layer may represent a single host (e.g., located at a single Internet Protocol (IP) address or Universal Resource Locator (URL)) or more generally an association between one or more related content management servers 150. The tenants may be separate or distinct entities or organization (collectively entity), sub-groups (e.g., sub-entities, departments, etc.) of an entity, or have almost any other affiliation or association whereby it is desired to segregate the management of the content of those entities.

In order to implement multiple tenancy in this type of architecture, and to ensure that the data of the multiple tenants is secure, there is usually a deployment of a content (management) server 150 for each tenant to which it is desired to provide content management services. For instance, in the depicted example, content server 150a may be deployed for a first tenant "Tenant 1" while content server 150b may be deployed for a second tenant "Tenant 2." These content servers 150 may be deployed, for example, on standalone physical computing servers or may be deployed on a web services platform, where that web services platform may be implemented using a proprietary server or servers (e.g., owned or maintained by the providers of the web service platform) or may be executing on third party platform such as a cloud computing platform or the like.

A content server 150 requires data storage and management to implement the content management services. Accordingly the content servers 150 may access a database (DB) layer 140 used for such data storage and data management. This database layer 140 may be a database cluster as are known in the art. An example of such a database is Postgres or the like. Thus, in the depicted deployment each content server 150 may have a corresponding database 142 defined in the database layer 140. This database 142 for a content server 150 associated with a tenant includes the managed content 144 associated with the corresponding tenant along with the metadata 146 for managing the content 144 and for operation of the corresponding content server 150 deployed for the tenant. The access to the database may be accomplished, for example, through a database (DB) connection object 116 associated with database 142 corresponding to the content server 150.

Thus, each tenant is provided with their own distinct instance of the content server 150, including distinct databases 142 for each instance of the content server. Various client applications 120 (usually remote) in a client layer 122 may request services offered by each corresponding content server 150 using the services interface 112 offered by the content server 150. This interface 112, may be a web services interface which may be a REpresentational State Transfer (REST), an Application Programming Interface (API) or the like.

In some cases these client applications 120 may be proprietary client applications executing on a user client's computing device associated with, or provided by, the provider of the content server 150, or may be browser based interfaces provided by the provider of the content server 150. For example, a user at a client device may access a certain location (e.g., URL) associated with the content server 150 (or content server interface 112) using a browser and a browser based application for accessing the content server 150 may be provided.

As the user interacts with the client application 120, requests for various services provided by the content sever 150 may be sent by the client application 120, received through the interface 112 of the content server 150 and the content server 150 may take appropriate actions based on the requests. These requests may include, for example, requests associated with the access or storage of content 144 in the database 142. In particular, each client application 120 is associated with a corresponding tenant. Here, for example, client application 120a is being used by a user associated with Tenant 1 while client application 120b is being used by a user associated with Tenant 2.

Thus, requests from client applications 120 associated with a particular tenant may be directed to the interface 112 of the corresponding content server 150 associated with that tenant. Here, again, requests from client application 120a associated with Tenant 1 may be directed to interface 112a of content server 150a while requests from client application 120b associated with Tenant b may be directed to interface 112b of content server 150b.

Accordingly, in most cases, when a client application 120 access the interface 112 of a corresponding content server 150 associated with a tenant, the content server 150 may establish a user session for that user where that user session is linked with the database connection object 116 (e.g., 116a and 116b) configured for accessing the database 142 having associated with that tenant. When the client application 120 submits a request that requires access to the database 142, the request is received by the content server 150 and linked with the user session and thus the corresponding database connection object 116. The content server 150 can thus access the proper database 142 in the database layer 140 and perform any needed operations to accomplish the request submitted by the client application 120, including the storage, access or management of content 144, using metadata 146.

Thus notice that a typical provisioning of multitenancy in a content management environment requires a corresponding instance of a content server 150 for each tenant where each of the content servers 150 is running in a different host or container (such that the interface 112 may be accessed at a distinct location by each tenant). Each of these content servers 150 may also require a distinct interface between the content server 150 and the corresponding database 142 in the database layer 140. Moreover, each content server 150 may utilize a certain amount of memory, including system memory 114 (such as RAM or the like) and memory used for a cache 118 (which may include object and metadata specific to the management content or which may store system management data (such as objects or metadata associated with system management)). The memory utilized by the content server 150 may thus need to be replicated across each instance of the content server 150. Additionally, whatever system processes or other resources are required to implement the content server 150 must also be replicated across all the instances of the content server 150 including licenses, operating systems, etc. On top of all of these considerations there is the actual time, knowledge and interaction required to provision an instance of a content server 150 when it is desired to provide content management to a new tenant. The deployment and configuration of a content server 150 is usually not a trivial undertaking and can take on the order of hours or longer.

It would therefore be desirable to have multitenant content management systems that simplify the addition of tenants and that remain efficient, powerful, and scalable while preserving isolation of data between tenants. Embodiments as disclosed herein may thus provide a multitenant content management server deployed on a services platform that utilizes a partitioned database. The partitioned database includes a global partition, and a tenant partition for each of the tenants. The global partition includes metadata or other data that may be used by the content management server, including common data that may be shared across all tenants or utilized in the provisioning of content management for all tenants. Each tenant partition may be used to store data specific to that particular tenant, including the content associated with that tenant and stored or accessed by that tenant's users.

With embodiments of this arrangement, the tenant specific data is isolated into individual database partitions (e.g., which may be created and managed dynamically within the content management server) while common data that can be shared across tenants is segregated into the global database partition. As such, embodiments may achieve scalability, more optimal memory utilization, and performance for content management servers, since a single instance of the content management server serves multiple tenants (e.g., entities or sub-entities within an entity).

Figure 2:
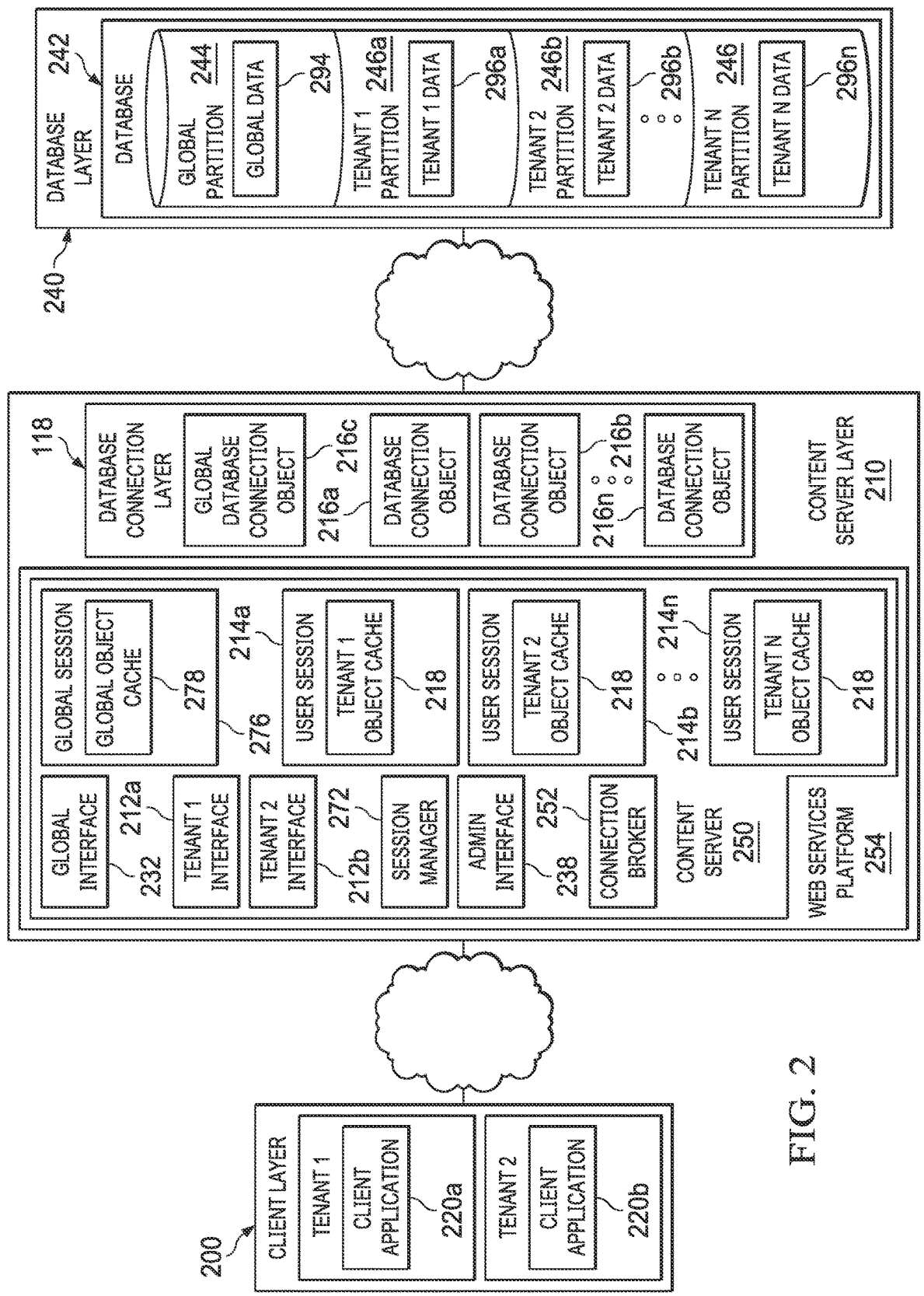
FIG. 2 is a diagrammatic representation of a computing architecture including an embodiment of a multitenant content server.

Looking at FIG. 2, an architecture for just such multitenant support in a content management services environment is depicted. Here, content server layer 210 may provide content management for content associated with a set of tenants. This content server layer 210 may include a content server 250 that may be accessed at multiple host names, paths or URLS (or a single host name or path with different sub-paths or parameters). The tenants may be separate or distinct entities or organization (collectively entity), sub-groups (e.g., sub-entities, departments, etc.) of an entity, or have almost any other affiliation or association whereby it is desired to segregate the management of the content of those entities.

Content server 250 may store data from the different tenants and metadata for managing the content (and generally operation of the content management server 250) in database 242 of database layer 240. The content server 250 may be deployed on a web services platform 254 where that web services platform 254 may be implemented using a proprietary server or servers (e.g., owned or maintained by the providers of the web service platform 252) or may be executing on third party platform such as a cloud computing platform or the like.

Figure 4:
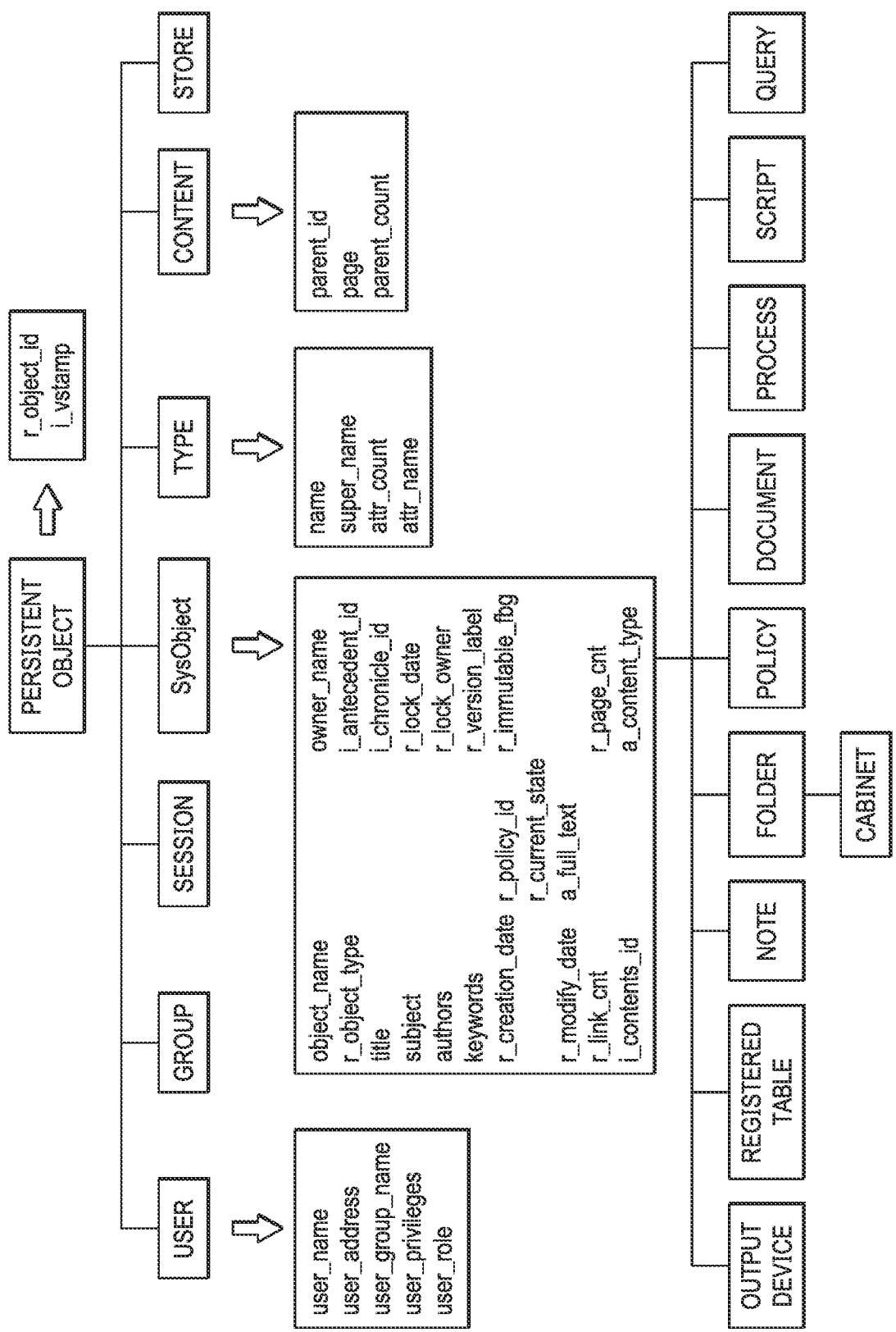
FIG. 4 is a diagrammatic representation of an object schema for one embodiment of a content server.

In certain embodiments, content server 250 may maintain the content that is actually being managed and other data that may be utilized by the content server 250 (e.g., which may generally be referred to as metadata). The metadata may be separated into various categories such as users, groups and documents and may be represented in various associated tables dm_user, dm_group and dm_sysobject, etc. Certain of these types may be deemed system types. FIG. 4 depicts an example of a schema for the objects that may be maintained by one embodiment of a content server 250.

In some embodiments the data of these types may be defined in two ways 1) single value attributes and 2) multi value attributes. According to one embodiment of a schema, single value attributes may be stored in a table suffixed with "_s" while multi value attributes for an object type are stored in a table suffixed with "_r" table in the data base 242.

For example, dm_sysobject may store object types with information about managed content. As an example of an output of a dm_sysobject table:

```
API> retrieve,c,dm_sysobject where object_name =
'testdoc'
...
0800147e800039c7
API> dump,c,l
...
USER ATTRIBUTES
    object_name    :    testdoc
    authors             [0]: Rayudu
                        [1] : Sekhar
```

So, for an example single value attribute and its data:
SQL>select object_name from dm_sysobject_s where r_object_id='0800147e800039c7'
OBJECT_NAME
--------------------------------------------------------------
------------------
testdoc
While for an example repeating value and its data:
SQL>select authors, i_position from dm_sysobject_r where r_object_id='0800147e800039c7'
AUTHORS
I_POSITION
--------------------------------------------------------------
Shekar
−2
Rayudu
−1

In order to implement multiple tenancy in this type of architecture, and to ensure that the data of the multiple tenants is secure, the database may be partitioned. Such partitioning may include, for example, splitting or separating a database table into smaller, individual tables which may be distinct and managed separately, In this way, queries may execute more quickly (e.g., because there is less data to evaluate).

Referring back to FIG. 2, here, the database 242 may be partitioned into a set of partitions, including a global partition 244 and one or more tenant partitions 246. The global partition 244 includes global data 294, including metadata or other data, that may be used by the content management server 250, including common data that may be shared across all tenants or utilized in the provisioning of content management for all tenants. Specifically, the tables of the database may include a column (e.g., an "i_partition" column) for all tenant specific types that can used to assign a partition or tenant to an object. These tables may include, for example, a user table (e.g., dm_user) for user details and a system object table (dm_sysobject) for content details.

Thus, in certain embodiments, when the content server 250 is initially provisioned or deployed, global partition 244 (e.g., which may be partition 0 or assigned an identifier of 0) may be created so that common data (including metadata) that can be shared across all tenants (e.g., that will use content server 250) will be stored in the global partition. The global data 294 may be used to manage the content management server 250 and control access to the tenant data in the tenant partitions 246. For example, in instances where the content server 250 is an OpenText™ Corporation's Documentum™ Content Server, Documentum™ Web Services or Content Server Web Services, this global data 294 may include system objects, job objects, methods objects, workflow object and data dictionary object.

In particular, according to certain embodiments, the global data 294 may include an object table that represent object types, objects, a mapping between object types and tenants, a mapping between objects and the associated tenant and a mapping between the object and the location of the content represented by that object. Each tenant partition 246 may be used to store data specific to that particular tenant, including the content associated with that tenant and stored or accessed by that tenant's users.

Thus, tables of the content server 250 that may be partitioned, or assigned in whole or in part to a partition, may have a columnar value that tracks the partition to which an object has been assigned as discussed. For example, in one embodiment, an integer column (e.g., i_partition) can be added to the tables of types that are partitionable. That column value (e.g., the i_partition value) may be assigned a tenant identifier and can be used as the partition key when the database tables are created. The value of the column may be exposed as an attribute in the base type of an object so the content server 250 can read, write or modify or otherwise access the partition where an object's data (e.g., metadata) is stored, an write queries to target specific partitions, and can group related objects into the same partition.

For example, an object type table may track the type of object used by the system and can be utilized by the content server 250 in retrieving the values for an object or object type. This table may include the object type and the object id of each object managed by the content server 250, including those objects associated with the content managed by the content server 250. This table may have an columnar value (e.g., an i_partition value) that associated each of the objects with a corresponding tenant.

Accordingly, there may be a system table that tracks the partitions and can be utilized to assign a tenant (e.g., an identifier for a particular tenant) to a particular partition among other system tables. When an instance of a multi-tenant content server 250 is provisioned these system tables including any tenant specific tables (e.g., "_r" and "_s" tables in one embodiment) may be created with a column for identifying partitions (e.g., i_partition) and a global tenant assigned a particular partition identifier (e.g., partition 0) may be created. Additionally, a subscription configuration table (e.g., dmi_subscription_config) that include an object name attribute that specifies the name of a tenant and a tenant identifier attribute that stores an identifier (e.g., a partition value) for that tenant.

In one embodiment, for example, a dm_sysobject_s table may be created as follows:
CREATE TABLE "MYDOCBASE3". "DM_SYSOBJECT_S"
("R_OBJECT_ID" VARCHAR2 (16 BYTE), "OBJECT_NAME" VARCHAR2(255 BYTE), "R_OBJECT_TYPE" VARCHAR2(32 BYTE), "I_PARTITION" NUMBER (10,0),) SEGMENT CREATION IMMEDIATE TABLESPACE "DM_MYDOCBASE3_DOCBASE" partition by list (I_PARTITION) (partition Global values (0));

Once the global partition 244 is established, a session manager 272 of the content server 250 can establish a global session 276 which can be accessed through a corresponding global interface 232. Such a global session 276 may be given access to the global data 294 in the global partition along with tenant data 296 from each tenant partition 246. The interface 232 may be a set of classes (e.g., implemented in a programming language such as Java) that makes certain functionality available to other programs through a set of defined interfaces. Such an interface 232 may be thought of as an object relational mapper for programmatically accessing or manipulating objects in the database 242.

The global session 276 is associated with the global partition 244 and with a corresponding global database connection object 216c such that the global session 276 can access the global data 294 of the global partition 244 through an associated global database connection object 216c. Thus, requests received through the global interface 232 may be processed using the global session 276 and the global connection object 216c allowing requests to be accomplished with respect to the global data 294 (or any data that may be associated with a tenant partition 246).

System jobs executing on content server 250 may thus use the global interface 232 and global session 276 to perform system management tasks such as workflows, tasks or jobs associated with the content server 250. Additionally, a global object cache 278 may be maintained in association with the global session 276 such that objects accessed by applications utilizing the global interface 232 and global session 276 may be accessed more quickly. This global object cache 278 may maintain data from global partition data 294. For example, the global object cache 278 may maintain an object or object type table for all tenants, such that object types or objects associated with a particular tenant can be determined. In some embodiments, the global object cache 278 may allow access by session object 214 to the global object cache 278.

Moreover, through the global interface 232, partitions 246 associated with specific tenants may be established or removed dynamically while content server 250 is executing. Specifically, the content server 250 may offer a subscription or administrator interface 238 that may be accessed at a particular URL or path by an authorized user. This administrator interface 238 may offer a variety of functionality including subscription and administrative functionality, including for example licensing details, provisioning a new tenant, obtaining a number of valid users, monitoring of tenants or user counts or other functionality.

This administrative interface 238 for the provisioning of a new tenant that may be accessed by an administrator associated with an entity or sub-entity (e.g., an existing tenant) during operation of the content server 250. The administrative interface 238 may also provide other functionality such as adding administrative users to manage specific tenants, monitor tenant session or limit the number of tenants for the instance of the content server 250.

Such a user may, for example, be an administrative user for an enterprise or other entity that wishes to establish (e.g., add) a tenant at the content server 250 for a department or other group within the entity. When an administrative user desires the provisioning of another tenant, the content server 250 can create a new partition in the database and update the global data 294 (e.g., the global tables) in the global partition 244 to indicate the identifier for the partition.

Such an administration interface 238 may be based on a subscription model, whereby the user desiring to create a new tenant may submit a request for a tenant provisioning link (e.g., URL) and a URL associated with the administrator interface 238 may be provided such that when the user accesses the link the user submits a request to the administrator interface 238 to provision a new tenant.

The administrator interface 238 can then send the request (e.g., the URL request or received link or other information) to the global interface 232 to provision a tenant repository. The global interface 232 may issue a call (e.g., a remote procedure call) or other request to content server 250 to create a new tenant with a unique partition identifier for the tenant. Such a call may take the form of, for example for the provisioning of a new tenant ("tenant 1"):

apply, c,NULL,CREATE_TENANT,TENANT_NAME, S,tenant1

The content server 250 can process the received request to create the tenant database partition 246 for the tenant to store the tenant specific information. The creation of a tenant partition may include getting a maximum partition value from a subscription table (e.g., dmi_subscription_config) type using a query such as: "select max(tenant_id) from dmi_subscription_config_s table," then incrementing this value for the new tenant partition value.

Them, the system (e.g., global) tables of global data 294 stored in the global partition 244 may be modified to include the identifier for the new tenant being added, and associate the tenant identifier with the tenant and partition 246 created. Continuing again with above example, to create a database partition 246 for a particular tenant (e.g., here tenant 1), the following command may be executed by the content server:

ALTER TABLE dm_sysobject_s ADD PARTITION tenant1 VALUES (1)

At his point other system object can be modified or created for the tenant. For example, A default tenant administrator, folder, cabinet of file system objects may be created to configure the newly created tenant in partition space, indicating these objects belong to the newly created tenant. Next a configuration object may be created (e.g., a new dmi_subscription_config object with object_name as tenant1 with the partition value).

Once the partition 246 for the new tenant is created in the database 242, in one embodiment, a tenant interface 212 associated with that partition may be adapted to access and perform requests with respect to the tenant data 296 of that partition 246. To provide details of the tenant interface 212 to a requesting application 220 in a client layer 200 one or more connection brokers 252 can be updated with the connection details for that tenant. Specifically, in some embodiments the connection broker 252 may be a process that listens (e.g., on a particular port of the content server 250) for session requests to the content server 250 and provides connection information in response to these requests.

It will be noted here that, while in the particular embodiment depicted, the connection broker 252 resides in the same host as content server 250 and there is only a single depicted connection broker 252 it will be understood that connection broker 252 may also be located in a number of other locations in the environment, and that there may be multiple, distributed connection brokers 252. For example, connection broker 252 coupled be in a host where the content server 250 resides, or in another external host. The content server 250 can sends an associated running port number (e.g., possibly along with other host information) to any connection brokers 252 in the environment which are configured to provide details for that content server 250. The content server 250 details are then sent by the connection broker 252 to requesting client applications 220.

Specifically, in one embodiment, the connection broker 252 responds to a connection request for a particular repository, tenant or partition with one or more valid addresses, paths or port number. The addresses, paths or port number associated with a tenant may be associated with a tenant interface 212 for the tenant such that a request associated with a particular tenant may be routed to, or received by, the associated tenant interface 212. Each of these tenant interfaces 212 may reside on a distinct application server (e.g. residing at a different address or port from content server 250) such that the connectivity information provided for the tenant interface 212 may be associated with the application server. In addition, the connection broker 252 may keep track of the status of each repository, partition or database associated with the content server 250.

When users associated with a tenant access the content management server 250 they are identified with a particular tenant. A session object 214 for that user's session with the content management server 250 is thus associated with the partition identifier for the particular session 214, such that the requesting user can only access tenant data 296 of a tenant partition 246 specific to that tenant. In this manner, the user's access to data from the partitions of other tenants is governed.

Moreover, any content that the user adds (e.g., or alters) during the session with the content management server will also be assigned and stored in the partition 246 associated with the tenant by associating the identifier for the tenant with the objects created or stored to manage the content (e.g., in an i_partition column of the tables used to manage or identify such objects).

Accordingly, multiple users associated with multiple tenants may each utilize the services provided through the content server 250 using client applications 220. When a particular client application 220 connects to the content server 250 it may connect through a particular tenant interface 212 particular to that tenant associated with a user. For example, as depicted, a first client application 220*a* for a user associated with a first tenant (Tenant 1) may interact with the content server 250 using a first tenant interface 212*a* while a second client application 220*b* for a user associated with a second tenant (Tenant 2) may also interact with the content server 250 using another tenant interface 212*b*.

A session manager 272 of the content server can analyze the incoming request and determine if a request should be serviced using the global session 276 or if a user session 214 should be established for that user. In particular, the URL or other data of the request received from the client application 220 may include a tenant identifier. When client application 220 attempts to access the content server 250 through the tenant interface 212, the user of the client application 220 may be authenticated to determine if the user should have access to content server and whether the user should have access to that tenant's partition 246.

For example, the user may be asked to provide some form of authentication credentials including a user identifier such as a user name and password through an interface presented through the client application 220 or an email address and password, etc. Once the user is authenticated, a tenant associated with the user may be determined and verified against the tenant identifier included in the received request from the client application 220. For example, a user identifier may be used in association with an authentication or directory service such as an OpenText Directory Service (OTDS) or Active Directory or Lightweight Directory Access Protocol (LDAP) server to determine the tenant associated with the user.

If the user is authenticated as having appropriate access for the tenant a user session 214 for that user and application 220 can be established at the content server 250. Moreover, that user session 214 is linked with a database connection object 216 in database connection layer 218 that is configured for accessing the particular partition 246 for the tenant associated with the user and client application 220.

The user session 214 may also include an identification of the tenant associated with the user session 214 and a tenant object cache 218 for that user session 214. Only objects from the tenant data 296 for that tenant partition 294 for the identified partition may be stored in the tenant object cache 218 for the user session 214. In some embodiments, the tenant object cache 218 may include object types and tables describing these object types that are specific to the tenant such that those object or object types may be quickly accessed.

Specifically, once the tenant associated with the user of the client application 220 is determined and authenticated, a database connection object 216 configured for accessing the partition 246 in database 242 corresponding to that determined tenant may be created or otherwise obtained and associated with the corresponding user session 214 for the user such that requests requiring access to database 242 received from that client application may be directed to the tenant partition 246 in database 242 using that database connection object 216 for the user session 214.

When a client application 220 subsequently submits a request that requires access to the database 242, the request is received by the tenant interface 212 for that tenant and routed to the user session 214 associated with that user and client application 220. The tenant identifier associated with the user session 214 can be used to control the access of the user to only objects to which users of that tenant should have access, including, for example, tenant data 296 associated with that tenant partition 246 or object in global data 294 associated with that tenant.

For example, as depicted, a first web client application 220*a* for a first user associated with the first tenant (Tenant 1) may interact with the content server 250. Based on this interaction, content server 250 may determine the first user using that application 220*a* is associated with the first tenant, create user session 214*a* and database connection object 216*a* associated with the first tenant and first user and configured to access tenant partition 246*a* in database 242 associated with the first tenant.

Thus, when client application 220*a* subsequently submits a request that requires access to the database 242, the request is received by the content server 250 through the associated tenant interface 212*a*, the user session 214*a* associated with the first user and client application 220*a* is determined and the content server 250 can access the appropriate partition 246*a* and tenant data 296*a* for the first tenant using database connection object 216*a* linked to user session 214*a* for performing any needed operations to accomplish the request.

To illustrate in more detail, if the request received from the client application 220*a* through the tenant interface 212*a* is requesting access to a content, content server 250 may access the object representing the content to determine if the requested content is associated with the first tenant. If the object representing the content is not a tenant specific object, in most cases this may be accomplished by referencing the global data 294 of the global partition 244 (e.g., which may be accessed through the global interface 232 and may be stored in the global object cache 278). If the content is associated with the first tenant, the content server 250 can access the requested content (stored in the tenant data 296*a* of tenant partition 246*a*) through the user session 214*a*. If the request is to store content at the content server 250, the content server 250 may create an object representing that content. If the object to be created is not a tenant specific type the object may be created in the global data 294 of the global partition 244 and associated with the identifier for the first tenant. The content itself may be stored in the tenant data 296*a* of the partition 246*a* associated with the first tenant, and the location of the content in the partition 246*a* associated with the object representing that tenant (e.g., in the global data 294).

Similarly, a second web client application 220*b* for a second user associated with the second tenant (Tenant 2) may interact with the content server 250. Based on this interaction, content server 250 may determine the second user using that application 220*b* is associated with the second tenant, create user session 214*b* and database connection object 216*b* associated with the second user and the second tenant and configured to access partition 246*b* in database 242 associated with the second tenant.

Here, when client application 220*b* subsequently submits a request that requires access to the database 242, the request is received by the content server 250 through the associated tenant interface 212*b*, the user session 214*b* associated with the second user and client application 220*b* is determined and the content server 250 can access the appropriate partition 246*b* and tenant data 296*b* for the second tenant using database connection object 216*b* linked to user session 214*b* for performing any needed operations to accomplish the request.

Figure 3:
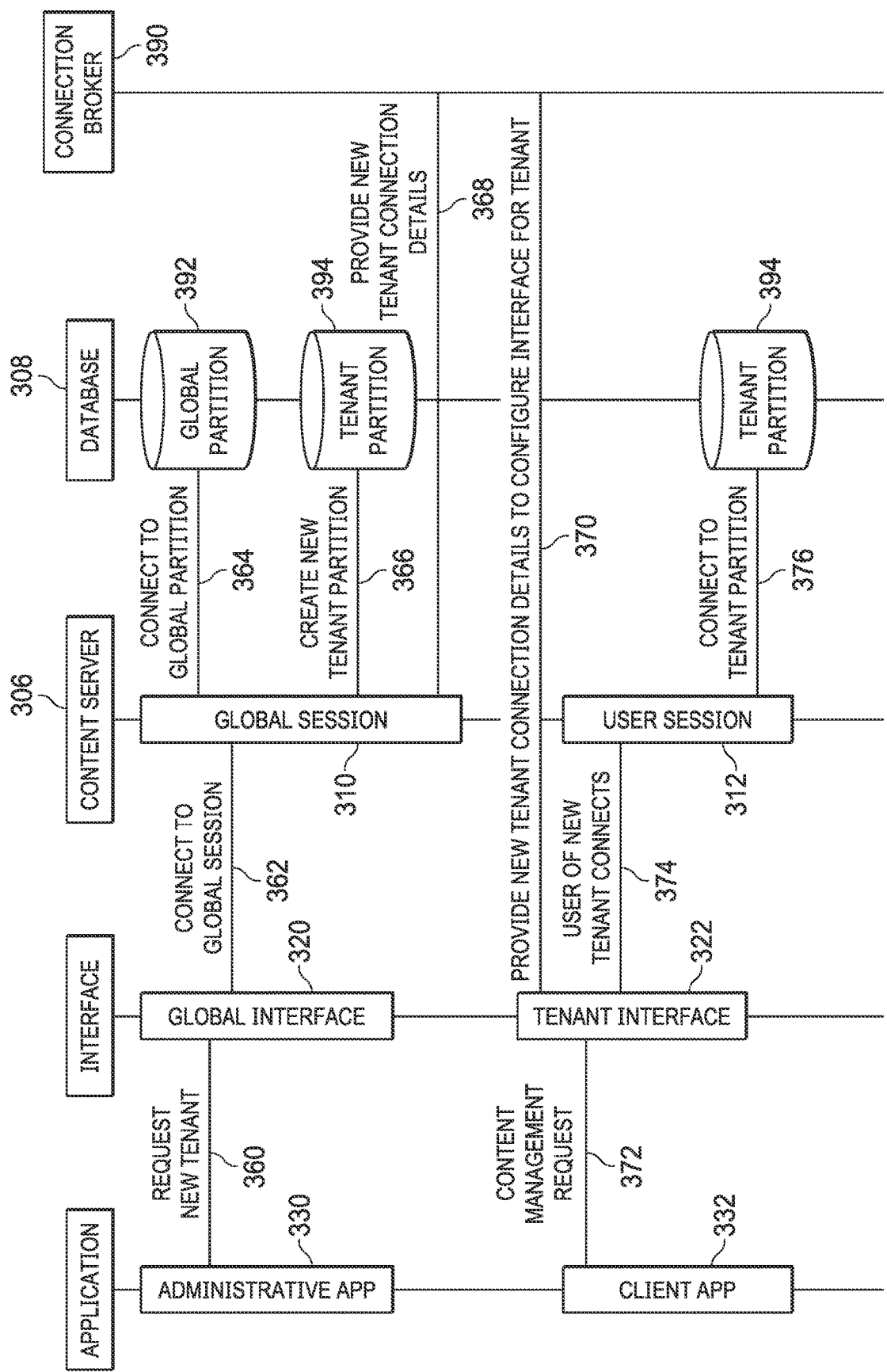
FIG. 3 is a diagrammatic representation of one embodiment of a flow for implementing multitenancy in a content server.

With reference to FIG. 3, a flow diagram for the provisioning and use of tenant partitions in a multitenant content management services environment is depicted. Multitenant content server 306 may be deployed on a web services platform to provide management of content for multiple tenants, where the tenants may be separate or distinct entities or organization (collectively entity), sub-groups (e.g., sub-entities, departments, etc.) of an entity, or have almost any other affiliation or association whereby it is desired to segregate the management of the content of those entities.

Accordingly, when the content server 306 is initially provisioned or deployed, global partition 392 of a database of the content server (e.g., which may be partition 0 or assigned an identifier of 0) may be created so that common data (including metadata) that can be shared across all tenants (e.g., that will use content server 306) will be stored in the global partition. This global data may be used to manage the content management server 306 and control access to the tenant data. For example, in instances this global data may include system objects, job objects, methods objects, workflow object and data dictionary object.

In particular, according to certain embodiments, the global data may include an object table that represent object types, objects, a mapping between object types and tenants, a mapping between objects and the associated tenant and a mapping between the object and the location of the content represented by that object. In certain cases, then tables of the content server 306 that may be partitioned, or assigned in whole or in part to a partition, may have a columnar value that tracks the partition to which an object has been assigned. The value of the column may be exposed as an attribute in the base type of an object so the content server 306 can read, write or modify or otherwise access the partition where an object's data (e.g., metadata) is stored, an write queries to target specific partitions, and can group related objects into the same partition.

For example, an object type table may track the type of object used by the system and can be utilized by the content server 306 in retrieving the values for an object or object type. This table may include the object type and the object id of each object managed by the content server 306, including those objects associated with the content managed by the content server 306.

Additionally, there may be a system table that tracks the partitions and can be utilized to assign a tenant (e.g., an identifier for a particular tenant) to a particular partition among other system tables. When an instance of a multi-tenant content server 306 is provisioned these system tables may be created with a column for identifying partitions and a global tenant assigned a particular partition identifier may be created Once the global partition 392 is established, a global session 310 which can be accessed through a corresponding global interface 320 can be established. Such a global session 310 may be given access to the global data in the global partition 392. The interface 310 may be a set of classes (e.g., implemented in a programming language such as Java) that makes certain functionality available to other programs through a set of defined interfaces.

Thus, requests received through the global interface 320 may be processed using the global session 310 allowing requests to be accomplished with respect to the global data. Moreover, through the global interface 320, partitions associated with specific tenants may be established or removed dynamically while content server 306 is executing. Specifically, the global interface 320 of the content server 306 may offer a subscription or administrator interface that may be accessed at a particular URL or path by an authorized user using an administrative application 330.

This administrative application 330 may be used for the provisioning of a new tenant by an administrator associated with an entity or sub-entity (e.g., an existing tenant) during operation of the content server 306. Such a user may, for example, be an administrative user for an enterprise or other entity that wishes to establish (e.g., add) a tenant at the content server 306 for a department or other group within the entity. Such an administration interface may be based on a subscription model, whereby the user desiring to create a new tenant may submit a request for a tenant provisioning link (e.g., URL) and a URL associated with the administrator interface may be provided such that when the user accesses the link at the administrative application 330 the user submits a request to provision a new tenant.

When an administrative user desires the provisioning of another tenant, a request may be sent from the administrative application 330 requesting a new tenant (STEP 360) where that new tenant request is received at the global interface 320 of the content server 306. The global interface 320 may issue a call (e.g., a remote procedure call) or other request to content server 306 to create a new tenant with a unique partition identifier for the tenant.

When the content server 306 receives the request for a new tenant, a connection to the global session 310 can be established (STEP 362) along with a corresponding to the global partition 392 of the database 308 (STEP 364). Once the connection to the global partition is established, a new tenant partition 394 can be created in the database 308 (STEP 366). The content server 306 can thus process the received request to create the tenant database partition 394 for the tenant to store tenant specific information.

The content sever 306 can then update the global data (e.g., the global tables) in the global partition 392 to indicate the identifier for the partition. In one embodiment, the creation of a tenant partition 394 may include modifying the system (e.g., global) tables of global data stored in the global partition 392 to include the identifier for the new tenant being added, and associate the tenant identifier with the tenant and partition 394 created.

Once the partition 394 for the new tenant is created in the database 308, a tenant interface 322 associated with that partition 394 may be adapted to access and perform requests with respect to the tenant data of that partition 394. To adapt the tenant interface 322 for the newly added partition 394, in one embodiment new tenant connection details, including for example, a tenant identifier valid addresses, paths or port number may be provided to a connection broker 390 (STEP 368). This connection broker 390 can then configure the tenant interface 322 to service requests for that tenant partition by providing the new tenant connection details, including for example, a tenant identifier valid addresses, paths or port number to the tenant interface 322 (STEP 370).

In some embodiments, the connection broker 390 may be a process that listens (e.g., on a particular port of the content server 306) for session requests to the content server 306 and provides connection information in response to these requests. The connection broker 390 can thus respond to a connection request for a particular repository, tenant or partition with one or more valid addresses, paths or port number. The addresses, paths or port number associated with a tenant may be associated with the configured tenant interface 322 for the tenant such that a request associated with a particular tenant may be routed to, or received by, the associated tenant interface 322.

Users associated with the tenant may thus utilize the services provided through the content server 306 using client applications 332. When a particular client application 320 connects to the content server 306 it may connect through the particular tenant interface 322 particular to that tenant associated with a user. At some point then, a user associated with a tenant may utilize the client application 332 to interact with the content server 306 and submit a content management request (STEP 372).

When users associated with the tenant access the content management server 306 they are identified with the particular tenant. A session object 312 for that user's session with the content management server 306 is associated with the partition identifier for the particular session 312, such that the requesting user can only access tenant data of tenant partition 394 specific to that tenant. In this manner, the user's access to data from the partitions of other tenants is governed.

Moreover, any content that the user adds (e.g., or alters) during the session with the content management server 306 will also be assigned and stored in the partition 394 associated with the tenant by associating the identifier for the tenant with the objects created or stored to manage the content. In particular, the URL or other data of the request received from the client application 332 (STEP 372) may include a tenant identifier. When client application 332 attempts to access the content server 306 through the tenant interface 322, the user of the client application 332 may be authenticated to determine if the user should have access to content server and whether the user should have access to that tenant's partition 394.

If the user is authenticated as having appropriate access for the tenant, a user session 312 for that user and application 332 can be established at the content server 306 and the client application 332 linked with the user session 312 (STEP 374). The user session 312 may also include an identification of the tenant associated with the user session 312. The user session 312 is thus also linked (or connected) with the tenant partition 394 (e.g., based on the tenant identifier) (STEP 376).

When a client application 332 subsequently submits a request that requires access to the database 308, the request is received by the tenant interface 372 for that tenant and routed to the user session 312 associated with that user and client application 332. The tenant identifier associated with the user session 312 can be used to control the access of the user to only objects to which users of that tenant should have access, including, for example, tenant data associated with that tenant partition 394.

For example, if the request received from the client application 332 through the tenant interface 322 is requesting access to a content, content server 306 may access the object representing the content to determine if the requested content is associated with the tenant. If the object representing the content is not a tenant specific object, in most cases this may be accomplished by referencing the global data of the global partition 392 (e.g., which may be accessed through the global session 310). If the content is associated with the tenant, the content server 306 can access the requested content (stored in the tenant data of tenant partition 394) through the user session 312. If the request is to store content at the content server 306, the content server 306 may create an object representing that content. If the object to be created is not a tenant specific type the object may be created in the global data of the global partition 392 and associated with the identifier for the tenant. The content itself may be stored in the tenant data of the partition 394 associated with the tenant, and the location of the content in the partition 394 associated with the object representing that tenant (e.g., in the global data of global partition 392).

Although the invention has been described with respect to specific embodiments thereof, these embodiments are merely illustrative, and not restrictive of the invention. The description herein of illustrated embodiments of the invention is not intended to be exhaustive or to limit the invention to the precise forms disclosed herein (and in particular, the inclusion of any particular embodiment, feature or function is not intended to limit the scope of the invention to such embodiment, feature or function). Rather, the description is intended to describe illustrative embodiments, features and functions in order to provide a person of ordinary skill in the art context to understand the invention without limiting the invention to any particularly described embodiment, feature or function. While specific embodiments of, and examples for, the invention are described herein for illustrative purposes only, various equivalent modifications are possible within the spirit and scope of the invention, as those skilled in the relevant art will recognize and appreciate. As indicated, these modifications may be made to the invention in light of the foregoing description of illustrated embodiments of the invention and are to be included within the spirit and scope of the invention.

Thus, while the invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the invention.

Reference throughout this specification to "one embodiment", "an embodiment", or "a specific embodiment" or similar terminology means that a particular feature, structure, or characteristic described in connection with the embodiment is included in at least one embodiment and may not necessarily be present in all embodiments. Thus, respective appearances of the phrases "in one embodiment", "in an embodiment", or "in a specific embodiment" or similar terminology in various places throughout this specification are not necessarily referring to the same embodiment. Furthermore, the particular features, structures, or characteristics of any particular embodiment may be combined in any suitable manner with one or more other embodiments. It is to be understood that other variations and modifications of the embodiments described and illustrated herein are possible in light of the teachings herein and are to be considered as part of the spirit and scope of the invention.

In the description herein, numerous specific details are provided, such as examples of components and/or methods, to provide a thorough understanding of embodiments of the invention. One skilled in the relevant art will recognize, however, that an embodiment may be able to be practiced without one or more of the specific details, or with other apparatus, systems, assemblies, methods, components, materials, parts, and/or the like. In other instances, well-known structures, components, systems, materials, or operations are not specifically shown or described in detail to avoid obscuring aspects of embodiments of the invention. While the invention may be illustrated by using a particular embodiment, this is not and does not limit the invention to any particular embodiment and a person of ordinary skill in the art will recognize that additional embodiments are readily understandable and are a part of this invention.

Embodiments discussed herein can be implemented in a computer communicatively coupled to a network (for example, the Internet), another computer, or in a standalone computer. As is known to those skilled in the art, a suitable computer can include a central processing unit ("CPU"), at least one read-only memory ("ROM"), at least one random access memory ("RAM"), at least one hard drive ("HD"), and one or more input/output ("I/O") device(s). The I/O devices can include a keyboard, monitor, printer, electronic pointing device (for example, mouse, trackball, stylus, touch pad, etc.), or the like.

ROM, RAM, and HD are computer memories for storing computer-executable instructions executable by the CPU or capable of being compiled or interpreted to be executable by the CPU. Suitable computer-executable instructions may reside on a computer readable medium (e.g., ROM, RAM, and/or HD), hardware circuitry or the like, or any combination thereof. Within this disclosure, the term "computer readable medium" not limited to ROM, RAM, and HD and can include any type of data storage medium that can be read by a processor. For example, a computer-readable medium may refer to a data cartridge, a data backup magnetic tape, a floppy diskette, a flash memory drive, an optical data storage drive, a CD-ROM, ROM, RAM, HD, or the like. The processes described herein may be implemented in suitable computer-executable instructions that may reside on a computer readable medium (for example, a disk, CD-ROM, a memory, etc.). Alternatively, the computer-executable instructions may be stored as software code components on a direct access storage device array, magnetic tape, floppy diskette, optical storage device, or other appropriate computer-readable medium or storage device.

Any suitable programming language can be used to implement the routines, methods or programs of embodiments of the invention described herein, including C, C++, Java, JavaScript, HTML, or any other programming or scripting code, etc. Other software/hardware/network architectures may be used. For example, the functions of the disclosed embodiments may be implemented on one computer or shared/distributed among two or more computers in or across a network. Communications between computers implementing embodiments can be accomplished using any electronic, optical, radio frequency signals, or other suitable methods and tools of communication in compliance with known network protocols.

Different programming techniques can be employed such as procedural or object oriented. Any particular routine can execute on a single computer processing device or multiple computer processing devices, a single computer processor or multiple computer processors. Data may be stored in a single storage medium or distributed through multiple storage mediums, and may reside in a single database or multiple databases (or other data storage techniques). Although the steps, operations, or computations may be presented in a specific order, this order may be changed in different embodiments. In some embodiments, to the extent multiple steps are shown as sequential in this specification, some combination of such steps in alternative embodiments may be performed at the same time. The sequence of operations described herein can be interrupted, suspended, or otherwise controlled by another process, such as an operating system, kernel, etc. The routines can operate in an operating system environment or as stand-alone routines. Functions, routines, methods, steps and operations described herein can be performed in hardware, software, firmware or any combination thereof.

Embodiments described herein can be implemented in the form of control logic in software or hardware or a combination of both. The control logic may be stored in an information storage medium, such as a computer-readable medium, as a plurality of instructions adapted to direct an information processing device to perform a set of steps disclosed in the various embodiments. Based on the disclosure and teachings provided herein, a person of ordinary skill in the art will appreciate other ways and/or methods to implement the invention.

It is also within the spirit and scope of the invention to implement in software programming or code an of the steps, operations, methods, routines or portions thereof described herein, where such software programming or code can be stored in a computer-readable medium and can be operated on by a processor to permit a computer to perform any of the steps, operations, methods, routines or portions thereof described herein. The invention may be implemented by using software programming or code in one or more general purpose digital computers, by using application specific integrated circuits, programmable logic devices, field programmable gate arrays, optical, chemical, biological, quantum or nanoengineered systems, components and mechanisms may be used. In general, the functions of the invention can be achieved by any means as is known in the art. For example, distributed, or networked systems, components and circuits can be used. In another example, communication or transfer (or otherwise moving from one place to another) of data may be wired, wireless, or by any other means.

A "computer-readable medium" may be any medium that can contain, store, communicate, propagate, or transport the program for use by or in connection with the instruction execution system, apparatus, system or device. The computer readable medium can be, by way of example only but not by limitation, an electronic, magnetic, optical, electromagnetic, infrared, or semiconductor system, apparatus, system, device, propagation medium, or computer memory. Such computer-readable medium shall generally be machine readable and include software programming or code that can be human readable (e.g., source code) or machine readable (e.g., object code). Examples of non-transitory computer-readable media can include random access memories, read-only memories, hard drives, data cartridges, magnetic tapes, floppy diskettes, flash memory drives, optical data storage devices, compact-disc read-only memories, and other appropriate computer memories and data storage devices. In an illustrative embodiment, some or all of the software components may reside on a single server computer or on any combination of separate server computers. As one skilled in the art can appreciate, a computer program product implementing an embodiment disclosed herein may comprise one or more non-transitory computer readable media storing computer instructions translatable by one or more processors in a computing environment.

A "processor" includes any hardware system, mechanism or component that processes data, signals or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real-time," "offline," in a "batch mode," etc. Portions of processing can be performed at different times and at different locations, by different (or the same) processing systems.

It will also be appreciated that one or more of the elements depicted in the drawings/figures can also be implemented in a more separated or integrated manner, or even removed or rendered as inoperable in certain cases, as is useful in accordance with a particular application. Additionally, any signal arrows in the drawings/Figures should be considered only as exemplary, and not limiting, unless otherwise specifically noted.

As used herein, the terms "comprises," "comprising," "includes," "including," "has," "having," or any other variation thereof, are intended to cover a non-exclusive inclusion. For example, a process, product, article, or apparatus that comprises a list of elements is not necessarily limited only those elements but may include other elements not expressly listed or inherent to such process, product, article, or apparatus.

Furthermore, the term "or" as used herein is generally intended to mean "and/or" unless otherwise indicated. For example, a condition A or B is satisfied by any one of the following: A is true (or present) and B is false (or not present), A is false (or not present) and B is true (or present), and both A and B are true (or present). As used herein, including the claims that follow, a term preceded by "a" or "an" (and "the" when antecedent basis is "a" or "an") includes both singular and plural of such term, unless clearly indicated within the claim otherwise (i.e., that the reference "a" or "an" clearly indicates only the singular or only the plural). Also, as used in the description herein and throughout the claims that follow, the meaning of "in" includes "in" and "on" unless the context clearly dictates otherwise.

Although the foregoing specification describes specific embodiments, numerous changes in the details of the embodiments disclosed herein and additional embodiments will be apparent to, and may be made by, persons of ordinary skill in the art having reference to this disclosure. In this context, the specification and figures are to be regarded in an illustrative rather than a restrictive sense, and all such modifications are intended to be included within the scope of this disclosure. Accordingly, the scope of this disclosure should be determined by the following claims and their legal equivalents.

What is claimed is:

1. A system, comprising:
a multitenant server;
a database;
a non-transitory computer readable medium, comprising instructions for:
establishing a global partition in the database, where the global partition comprises one or more system tables including data associated with a plurality of tenants of the server;
establishing a global session associated with the server, the global session adapted to access the global partition of the database;
in response to receiving a request from a first user at a first client application:
determining that the request from the first user is associated with a first tenant;
based on the determination that the request from the first user is associated with the first tenant, establishing a first session at the server, wherein the first session identifies the first tenant using a first identifier associated with the first tenant and is adapted to limit access to the global partition or to a first tenant partition of the database established for the first tenant using the global session; and
in response to receiving a request from a second user at a second client application:
determining that the request from the second user is associated with a second tenant;
based on the determination that the request from the second user is associated with the second tenant, establishing a second session at the server, wherein the second session identifies the second tenant using a second identifier associated with the second tenant and is adapted to limit access to the global partition or to a second tenant partition of the database established for the second tenant using the global session.

2. The system of claim 1, wherein the instructions are further for:
in response to receiving a subsequent request:
based on a determination that the subsequent request is associated with the first tenant, performing the subsequent request using the first session associated with the first tenant by accessing the global partition to determine tenant data associated with the first tenant and accessing the first tenant partition using the first session to perform the subsequent request based on the tenant data associated with the first tenant; and
based on a determination that the subsequent request is associated with the second tenant, performing the subsequent request using the second session associated with the second tenant by accessing the global partition to determine tenant data associated with the second tenant and accessing the second tenant partition using the second session to perform the subsequent request based on the tenant data associated with the second tenant.

3. The system of claim 1, wherein the first session includes a first tenant cache adapted to only store data stored in the first tenant partition and the second session includes a second tenant cache adapted to only store data stored in the second tenant partition.

4. The system of claim 3, wherein the global session includes a global cache adapted to only store data stored in the global partition.

5. The system of claim 1, wherein the server is a content server.

6. The system of claim 1, wherein each session has a corresponding database connection object adapted to connect to the database.

7. The system of claim 1, wherein each of the requests is received at a web services platform providing an interface for the server.

8. A method, comprising:
establishing a global partition in a database at a multitenant server, where the global partition comprises one or more system tables including data associated with a plurality of tenants of the server;
establishing a global session associated with the server, the global session adapted to access the global partition of the database;
in response to receiving a request from a first user at a first client application:
determining that the request from the first user is associated with a first tenant;
based on the determination that the request from the first user is associated with the first tenant, establishing a first session at the server, wherein the first session identifies the first tenant using a first identifier associated with the first tenant and is adapted to limit access to the global partition or to a first tenant partition of the database established for the first tenant using the global session; and
in response to receiving a request from a second user at a second client application:
determining that the request from the second user is associated with a second tenant;
based on the determination that the request from the second user is associated with the second tenant, establishing a second session at the server, wherein the second session identifies the second tenant using a second identifier associated with the second tenant and is adapted to limit access to the global partition or to a second tenant partition of the database established for the second tenant using the global session.

9. The method of claim 8, further comprising:
in response to receiving a subsequent request:
based on a determination that the subsequent request is associated with the first tenant, performing the subsequent request using the first session associated with the first tenant by accessing the global partition to determine tenant data associated with the first tenant and accessing the first tenant partition using the first session to perform the subsequent request based on the tenant data associated with the first tenant; and based on a determination that the subsequent request is associated with the second tenant, performing the subsequent request using the second session associated with the second tenant by accessing the global partition to determine tenant data associated with the second tenant and accessing the second tenant partition using the second session to perform the subsequent request based on the tenant data associated with the second tenant.

10. The method of claim 8, wherein the first session includes a first tenant cache adapted to only store data stored in the first tenant partition and the second session includes a second tenant cache adapted to only store data stored in the second tenant partition.

11. The method of claim 10, wherein the global session includes a global cache adapted to only store data stored in the global partition.

12. The method of claim 8, wherein the server is a content server.

13. The method of claim 8, wherein each session has a corresponding database connection object adapted to connect to the database.

14. The method of claim 8, wherein each of the requests is received at a web services platform providing an interface for the server.

15. A non-transitory computer readable media, comprising instructions for:
  establishing a global partition in a database at a multi-tenant server, where the global partition comprises one or more system tables including data associated with a plurality of tenants of the server;
  establishing a global session associated with the server, the global session adapted to access the global partition of the database;
  in response to receiving a request from a first user at a first client application:
  determining that the request from the first user is associated with a first tenant;
  based on the determination that the request from the first user is associated with the first tenant, establishing a first session at the server, wherein the first session identifies the first tenant using a first identifier associated with the first tenant and is adapted to limit access to the global partition or to a first tenant partition of the database established for the first tenant using the global session; and in response to receiving a request from a second user at a second client application:
  determining that the request from the second user is associated with a second tenant;
  based on the determination that the request from the second user is associated with the second tenant, establishing a second session at the server, wherein the second session identifies the second tenant using a second identifier associated with the second tenant and is adapted to limit access to the global partition or to a second tenant partition of the database established for the second tenant using the global session.

16. The non-transitory computer readable media of claim 15, wherein the instructions are further for:
  in response to receiving a subsequent request:
  based on a determination that the subsequent request is associated with the first tenant, performing the subsequent request using the first session associated with the first tenant by accessing the global partition to determine tenant data associated with the first tenant and accessing the first tenant partition using the first session to perform the subsequent request based on the tenant data associated with the first tenant; and
  based on a determination that the subsequent request is associated with the second tenant, performing the subsequent request using the second session associated with the second tenant by accessing the global partition to determine tenant data associated with the second tenant and accessing the second tenant partition using the second session to perform the subsequent request based on the tenant data associated with the second tenant.

17. The non-transitory computer readable media of claim 15, wherein the first session includes a first tenant cache adapted to only store data stored in the first tenant partition and the second session includes a second tenant cache adapted to only store data stored in the second tenant partition.

18. The non-transitory computer readable media of claim 17, wherein the global session includes a global cache adapted to only store data stored in the global partition.

19. The non-transitory computer readable media of claim 15, wherein the server is a content server.

20. The non-transitory computer readable media of claim 15, wherein each session has a corresponding database connection object adapted to connect to the database.

21. The non-transitory computer readable media of claim 15, wherein each of the requests is received at a web services platform providing an interface for the server.

* * * * *